UNITED STATES PATENT OFFICE.

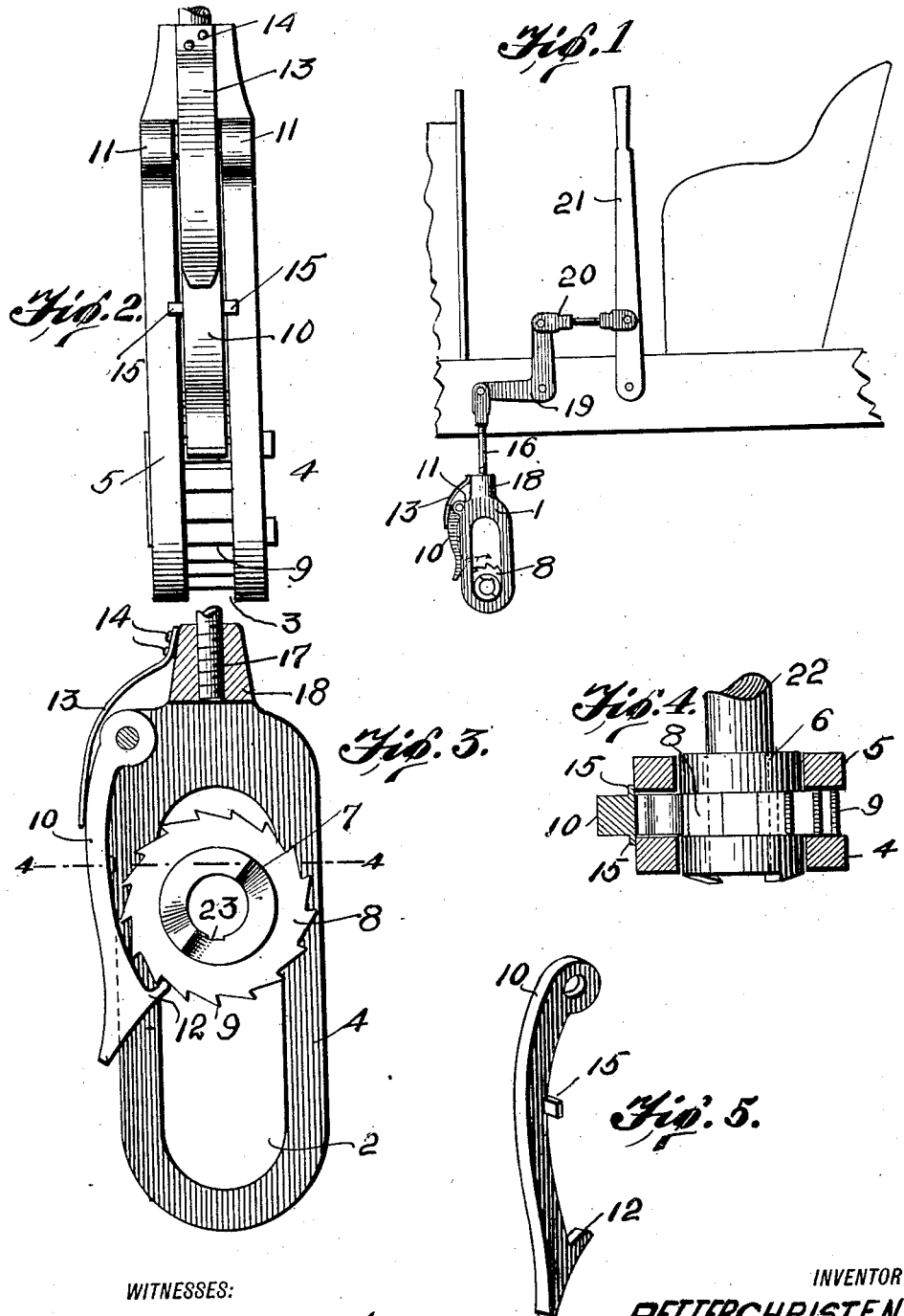

PETTER CHRISTENSEN, OF KINGSVILLE, TEXAS.

CRANKING DEVICE.

1,037,129.

Specification of Letters Patent. Patented Aug. 27, 1912.

Application filed April 8, 1911. Serial No. 619,831.

*To all whom it may concern:*

Be it known that I, PETTER CHRISTENSEN, a citizen of the United States, residing at Kingsville, in the county of Nueces and State of Texas, have invented certain new and useful Improvements in Cranking Devices, of which the following is a specification, reference being had therein to the accompanying drawing.

This invention relates to engine starters and the principal object of the same is to provide a starter which can be used upon an automobile, so that the engine can be started without leaving the machine.

Another object of the invention is to so construct the pawl which engages the teeth formed upon the starting sleeve, that the pawl will be held in the proper position to engage the teeth.

This invention is illustrated in the accompanying drawings, wherein:—

Figure 1 is a view showing the improved starting device mounted upon a machine. Fig. 2 is an end elevational view of the clutch portion of the starting device. Fig. 3 is a longitudinal sectional view through the clutch of the starting device. Fig. 4 is a transverse sectional view through the clutch along the line 4—4 in Fig. 3. Fig. 5 is a perspective view of the pawl which is mounted in the clutch.

Referring to the accompanying drawings by numerals it will be seen that this invention comprises a clutch 1 which is formed from any suitable metal such for instance as steel, and is provided with a central longitudinally extending opening 2 and with a longitudinally extending slot 3 which divides the clutch into the plates 4 and 5.

A sleeve 6 is slidably mounted in the clutch 1 and extends through the opening 2. The outer face of the sleeve is provided with teeth 7 so that if desired a crank of any suitable make can be used in place of the improved starting device. A flange 8 having teeth 9 is formed upon the sleeve and extends into the slot 3.

A pawl 10 is pivotally mounted between the pivot ears 11 formed adjacent the upper end of the clutch and has its tooth 12 extending into the slot 3 so as to engage the teeth 9. A spring 13 is secured to the clutch by means of the rivets 14 or by any other suitable means and has its free end resting upon the pawl so as to hold the pawl normally in a position to engage the device.

Lugs 15 extend from each side of the pawl and rest upon the plates 4 and 5 as clearly shown in Fig. 2 to prevent the pawl from moving into the slot a sufficient distance to cause the tooth to jam when riding over the teeth 9. A rod 16 is secured to the upper portion of the clutch by threading its end 17 into the socket 18 and has its free end pivotally connected with a bell crank 19 which is mounted upon the frame of the automobile. A link 20 connects the bell crank with an operating lever 21.

In assembling the device the two plates 4 and 5 have their free ends spread apart and the sleeve placed between them with the teeth between the plates and its ends passing through the openings 2. The plates are then returned to their normal position and the sleeve will be slidably and rotatably mounted in the clutch.

In the operation of this device, the starter is mounted upon the frame as shown in Fig. 1, with the sleeve 6 secured to the shaft 22 of the engine by means of a pin inserted in the groove 23. The lever is then moved so that the clutch will move downwardly and cause the tooth 12 to ride over the teeth 9 and engage one of them as shown in Fig. 3. The lever is then rocked in the opposite direction and the shaft will be turned and start the engine. After the engine is started, the starting device remains in the position shown in Fig. 1 and the sleeve can then turn without interfering with the starting device. If it is desired to start the engine with the ordinary crank, the crank is placed upon the sleeve with its teeth engaging the teeth 7 and the engine started in the ordinary manner.

It should be noted that the starting device can be used upon engines in which the engine is in the front of the machine and the starting shaft protruding from the front of the hood. When used with this kind of an engine, a suitable operating mechanism would be connected with the bell crank 19.

What I claim is:—

1. A starting device comprising a clutch provided with a central longitudinally extending opening and with a longitudinally extending slot, a sleeve slidably mounted in said opening and provided with a toothed flange extending into said slot, said sleeve adapted to be mounted upon an engine shaft, a pawl pivotally mounted upon said clutch, and extending through said slot to engage the teeth of said sleeve, lugs formed upon said pawl to limit the inward movement of said pawl, and an operating mechanism connected with said clutch.

2. A device of the character described comprising a clutch, a toothed sleeve slidably mounted in said clutch and adapted to be mounted upon an engine shaft, a pawl pivotally mounted upon said clutch and adapted to engage said teeth, means carried by said pawl for limiting the inward movement of said pawl, and an operating mechanism for moving said clutch to bring said pawl into and out of engagement with said teeth.

3. A device of the character described comprising a clutch having oppositely disposed plates, a sleeve adapted to be mounted upon an engine shaft slidably and rotatably carried by said plates and provided with teeth positioned between said plates, a pawl pivotally mounted upon said clutch, and having its free end extending between said plates and adapted to engage the teeth of said sleeve, means carried by said pawl for limiting its inward movement between said plates, means for moving said clutch to bring said pawl into engagement with said sleeve.

In testimony whereof I hereunto affix my signature in presence of two witnesses.

PETTER CHRISTENSEN.

Witnesses:
Wm. E. Herman,
Lee E. Williams.

Copies of this patent may be obtained for five cents each, by addressing the "Commissioner of Patents, Washington, D. C."